Oct. 16, 1928.  
L. M. WALDEN  
1,688,213  
DIRIGIBLE LIGHT  
Filed July 28, 1924  
2 Sheets-Sheet 1
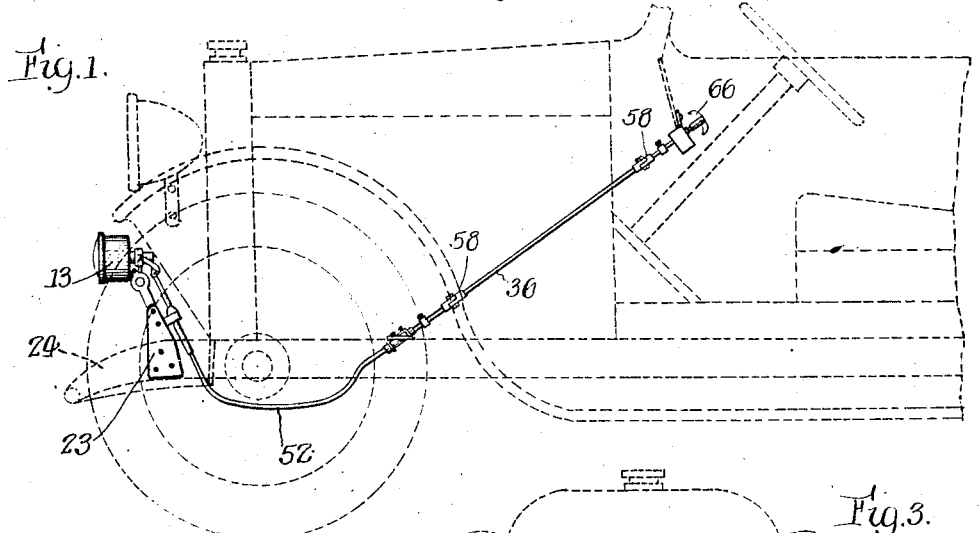
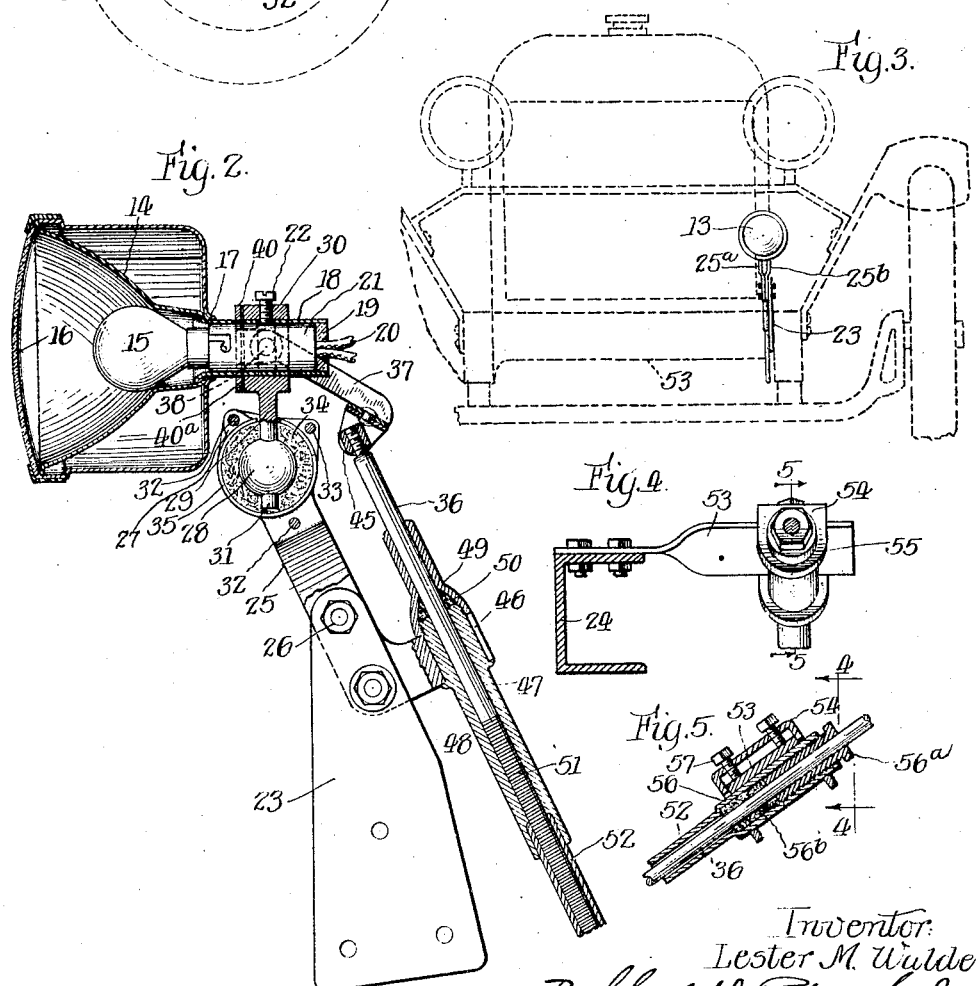

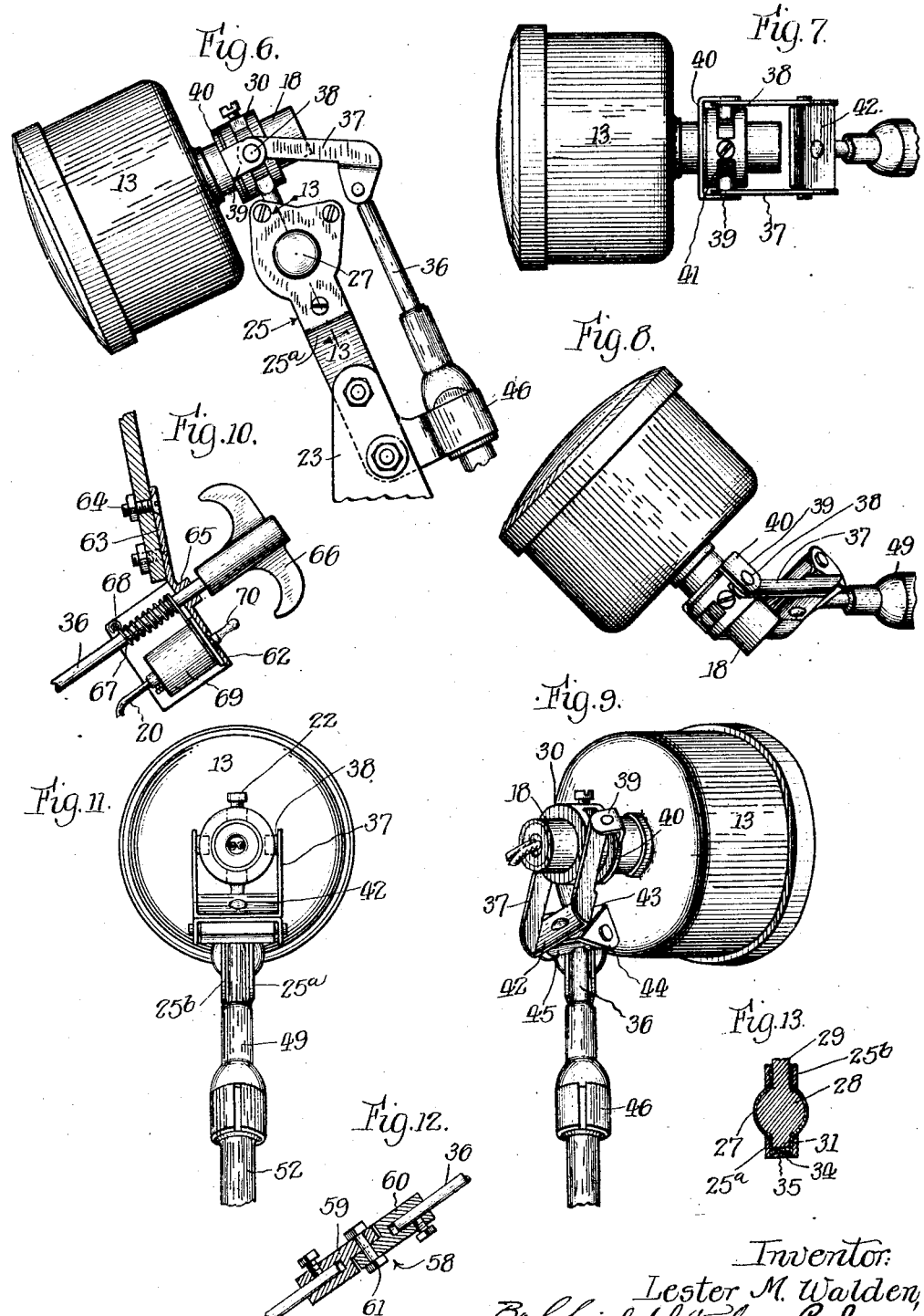

Patented Oct. 16, 1928.

1,688,213

UNITED STATES PATENT OFFICE.

LESTER M. WALDEN, OF CHICAGO, ILLINOIS.

DIRIGIBLE LIGHT.

Application filed July 28, 1924. Serial No. 728,690.

The invention relates to a lamp for motor vehicles and the like, of the dirigible type; and it concerns more especially the means for mounting the lamp in a manner such as to render it readily adjustable from a remote point.

The primary object of my invention is to provide a means for mounting a dirigible light which permits of a facile adjustment thereof throughout a wide range of movement.

A further object is to provide an adjustable support for a dirigible light and operating means therefor whereby the spotlight may be mounted advantageously at a point near the extreme forward end of the motor vehicle below the stationary headlights and at the same time may be controlled from the dash.

A general object is to provide a supporting and operating means of a thoroughly practical character capable of being manufactured on an economical basis.

In the accompanying drawings, I have shown one embodiment only of my invention, but I contemplate that various changes in the construction and arrangement hereinafter specifically set forth may be made by those skilled in the art without departing from the spirit and scope of the invention as expressed in the appended claims.

In the drawings Figure 1 is a fragmentary elevational view of my invention as applied to a motor vehicle.

Fig. 2 is a fragmentary vertical sectional view through the supporting means and a portion of the operating means.

Fig. 3 is a front elevational view of the device further illustrating the manner in which it is advantageously applied to a motor vehicle.

Fig. 4 is a fragmentary vertical sectional view illustrating a bracket providing a support for the operating means secured to the chassis of the vehicle within the motor compartment, the view being taken approximately in the plane of line 4—4 of Fig. 5.

Fig. 5 is a fragmentary sectional view taken approximately in the plane of line 5—5 of Fig. 4.

Fig. 6 is a fragmentary side elevational view of the supporting and operating means showing the relation of the parts when the lamp is directed downwardly in a straight-ahead direction.

Fig. 7 is a fragmentary top plan view of the device in the position thereof shown in Fig. 2.

Fig. 8 is a view illustrating the lamp turned from the position shown in Fig. 7 to the right.

Fig. 9 is a rear view showing the lamp in the position which it occupies in Fig. 8.

Fig. 10 is a fragmentary vertical sectional view illustrating the operating means associated with the dash of the vehicle.

Fig. 11 is a rear view of the parts as shown in Fig. 2.

Figs. 12 and 13 are fragmentary sectional views illustrating details of construction.

The lamp proper forming in itself no part of this invention is generally designated by the numeral 13. It comprises the usual reflector 14, bulb 15 and lens 16.

The rear wall of the lamp has a central opening 17 therein in which is rigidly mounted a tubular stem 18 closed at its rear end preferably by means of a fiber washer centrally apertured to permit the passage therethrough of wires 20 leading to the bulb 15. The latter has a seat in the forward end of a socket member 21 adjustable longitudinally in the tube 18 and held in adjusted position by means of a set screw 22.

The supporting means for the lamp, which I by preference employ, comprises a bracket 23 which in the present instance is fastened by means of bolts or the like to one of the forwardly projecting side rails 24 of the chassis (Fig. 1). Rising from said bracket and projecting slightly forwardly is an arm 25 constructed in the present instance of two similar pieces of metal $25^a$ and $25^b$ secured together at their lower ends by means of bolts 26 whereby the arm is rigidly secured to the bracket. At their upper ends, the portions $25^a$ and $25^b$ of the arm occupy a spaced relation as shown in Fig. 3, and each portion is apertured to provide a seat for a bearing plate 27 Fig. 13 depressed outwardly in its central portion. The two plates 27 provide in their central depressed portions seats for a ball 28 which is rigid with the shank 29 of an annular member 30 encircling the stem 18 and rigidly secured thereto by means of the screw 22. Rigid with the ball 28 and depending therefrom is a stud 31 which projects radially between the two bearing plates 27. This stud, together with the shank 29, operates, it will be observed, to hold the ball against turning in such a way as to permit the lamp to tilt laterally to one side or the other. In other words, the ball is capable of turning only on a horizontal axis extending transversely of the vehicle, being held by the stud and shank against turning on a horizontal axis extending longitudinally of the vehicle.

In addition to turning on a transverse horizontal axis, the ball, it will be observed, is capable of turning on an upright intersecting axis. The portions 25ª and 25ᵇ of the arm 25 may be secured together by means of screws 32, which may be readily adjusted to effect a frictional engagement between the ball and its bearing plates such that the ball shall not turn too freely therein. A pin 33 is also preferably provided in the arm portions 25ª and 25ᵇ in the path of movement of the stud 31 so as to act as a stop limiting the up and down tilting movements of the ball and hence of the lamp.

Preferably I provide about the ball 28 and between the arm portions 25ª and 25ᵇ a felt washer or ring 34 enclosed within a spring clip 35 which is entered neatly between the arm portions. This ring may be saturated with lubricant to reduce wear on the parts.

The operating means is of a character such that the lamp may be swung laterally from side to side on a shifting upright axis passing through the shank 29 of the member 30 and the ball 28, or up and down on a transverse horizontal axis passing through the ball. This means comprises in the preferred construction an operating rod 36 having a sliding pivotal connection with the member 30 such that a longitudinal movement of the rod effects an up and down swinging motion to the lamp and a consequent shifting of the upright axis passing through the ball 28, and a rotary or twisting movement of the rod imparts a lateral swinging motion to the lamp. The pivotal connection herein shown comprises a pair of links or arms 37 arranged one upon each side of the member 30 and connected thereto for pivotal and sliding movement through the medium of studs 38 (Figs. 7 and 11), said studs are carried by the rearwardly extending arms 39 of a U-shaped member 40 rotatable upon the tubular stem 18 of the lamp. The studs project laterally and inwardly into slots 41 which are formed in the opposite sides of the annular member 30, and it will be seen that in the rotation of the member 40 the studs slide in their respective grooves, holding the members 30 and 40 against relative longitudinal movement. Preferably a spring washer 40ª is interposed between the members 30 and 40.

The links 37 are connected together at their rear ends by means of a cross bar 42 which is pivoted centrally thereof to a plate 43 having down-turned arms 44 at its ends between which is pivotally mounted a block 45 rigid with the operating rod 36. The connection thus employed constitutes, it will be seen, a universal joint between the rod 36 and the links or arms 37.

Rigid with the bracket 23 is a split collar 46 herein shown as formed integral with the portions 25ª and 25ᵇ of the supporting arm 25, and within this collar 46 I provide a bearing sleeve 47 having a flange or collar 48 thereon between which and a screw threaded bushing 49 is clamped the collar 46. The forward end of the rod 36 operates in this bearing as shown clearly in Fig. 2. Preferably a packing material 50 is interposed between the bushing 49 and the sleeve 47 so as to exclude dust and dirt from the bearing.

As is shown clearly in Fig. 2, the forward end of the rod 36 is disposed at an angle to the axis of the lamp stem 18, so that when a twisting motion is imparted to the rod in one direction or the other the links 37 are respectively moved forwardly and rearwardly (Figs. 8 and 9) with the result that they impart a lateral swinging movement to the lamp through the medium of the members 30 and 40, the studs 38 operating in this movement, in the slots 41; and the greater the angular relation between the links and the stem the greater will be the extent of lateral movement imparted to the lamp. This angular relation may readily be varied to obtain a variation in the range of lateral swinging movement by imparting a longitudinal sliding movement to the rod; but in any given angular relation of the parts a twisting motion imparted to the rod will swing the lamp in a true lateral path, the lamp turning in this movement on the upright axis passing through the shank 29 of the member 30 and the ball 28.

In order that the lamp when located at the extreme forward end of the vehicle may be operated from the dash board of the vehicle, I interpose in the rod 36 a flexible connection in the form of a flexible shaft 51 preferably made of closely coiled wire; and I enclose this shaft in a metallic tube 52 which in the present instance is connected at its forward end to the forward end of the rod within the bearing sleeve 47, as shown in Fig. 2. Preferably the tube 52 is made of a metal such that it may be bent readily, and conveniently, it is bent into a substantially U-form so as to pass beneath the front cross bar of the chassis which supports the radiator. At its rear end the tube 52 passes upwardly into the motor compartment to receive the rear portion of the operating rod 36. To provide a support for the rear end of the tube I employ an arm 53 (Figs. 4 and 5) which may be secured to the adjacent chassis side rail 24. A U-shaped bracket 54 has depending apertured lugs 55 through which is entered a sleeve 56 secured to the rear end of the tube. A bushing 56ª may be threaded into the rear end of the sleeve to provide a bearing for the rod and to retain packing material 56ᵇ about the rod. The arm 53 passes between the bracket 54 and the sleeve 56, and a pair of screws 57 carried by the bracket and bearing against the arm 53 serve to clamp the sleeve 56 in position in the bracket.

To provide for further flexibility in the operating rod, a pair of pivotal joints 58 may be interposed in the rear portion of the rod. These joints (Fig. 12) may be of any suitable character consisting, for example, of two members 59 and 60 pivoted together by means of a pin 61. It will be observed that in arranging the joints 58 in the rod, their respective pivots 61 will be positioned perpendicularly relative to each other.

At the extreme rear end of the rod 36 is is slidably and rotatably supported in a U-shaped bracket 62 (Fig. 10) having an upwardly extending arm 63 which is secured to the dash as by means of bolts 64. The bracket has a flanged opening 65 therein providing a bearing for the rod, and a handle is made fast upon the extreme rear end of the rod for convenience in manipulating it. If desired, a coiled spring 67 anchored at one end to the bracket 68 and having its other end suitably anchored, provides a frictional connection between the bracket and the rod tending to hold the latter against too free movement.

The bracket also preferably provides a housing for a switch 69 of a suitable and well known character for controlling the light. Herein the rear end of the spring 67 bears against the switch casing. The operating finger piece 70 of the switch projects through an aperture in the lower portion of the bracket as shown clearly in Fig. 10.

The operation may be summarized briefly as follows: Assuming the parts to be in the position shown in Figs. 1 and 2, a longitudinal sliding movement imparted to the rod 36 by the operator of the vehicle causes the lamp to swing up or down on its horizontal transverse axis; and a rotary or twisting motion imparted to the rod causes the lamp to swing laterally, on an upright axis, to one side or the other. In this latter operation the rear ends of the links 37, rotating about the axis of the rod 36, cause the forward ends of the links and hence the member 40 connected thereto to tend to conform with their arc of rotation. Because, however, the axes of the rod and of the member 40 are at all times disposed in angular relation, a lateral swinging movement is imparted to the lamp.

I have found that it is desirable to mount the lamp at the extreme forward end of the vehicle below the ordinary stationary head lights. This position eliminates the possibility of light from the lamp being reflected rearwardly into the eyes of the driver, and it reduces to a minimum the glare which is so commonly experienced by motorists in connection with ordinary spotlights. The means which I have provided for supporting and operating the light lends itself readily to its location in such desired advantageous position, and also renders it possible readily to apply the light to existing vehicles. Moreover the operating means permits of a wide range of movement of the light so that it can be put to the various uses of which spotlights mounted upon the wind shield are capable.

The construction is relatively simple, the major portion of the parts being of a character such that they may be made from metal stampings. Also, there are no parts subjected to excessive wearing strains so that the device is very durable.

I claim as my invention:

1. The combination with a dirigible light, of a stationary bracket, a ball mounted in said bracket to turn on a transverse horizontal axis and also upon a shifting upright axis, a lamp, a member rigid with said ball and with said lamp, an operating rod, and means pivotally connecting said rod with said member upon opposite sides of the axis of the lamp whereby a twisting motion imparted to the rod causes the member to swing on its upright axis and a longitudinal movement imparted to the rod causes the member to swing on its transverse horizontal axis.

2. The combination with a member mounted to turn on a transverse horizontal axis and also on an upright axis, said member being adapted to provide a support for a vehicle lamp and having grooves in opposite sides disposed on opposite sides of the axis of the lamp, an operating rod arranged at an angle to the axis of the lamp, a pair of links each having a stud operating in one of said grooves and connected together in spaced relation, and a connection between said links and said rod whereby a twisting movement of the rod imparts to the lamp supported by said member a swinging motion in one direction and a longitudinal movement of the rod imparts to the lamp a swinging motion in another direction.

3. A dirigible light comprising, in combination, a lamp having a stem, a member rotatable relative to and about the axis of said stem but held against longitudinal movement relative thereto, means for supporting said member to permit it to turn on intersecting axes, an operating member mounted for longitudinal and rotational movement on an axis inclined with respect to the axis of the lamp, and means providing a connection between said members operable upon a twisting or longitudinal movement of the operating member to impart either a lateral or up and down swinging movement to the lamp on one or the other of said axes.

4. A dirigible light comprising, in combination, a lamp having a stem, a member rotatable on said stem but held against longitudinal movement relative thereto, means for supporting said member to permit it to turn on substantially perpendicular intersecting axes, an operating member mounted for longitudinal and rotational movement on an axis inclined with respect to the axis of the lamp, and means providing a connection between said members operable upon a twisting or longitudinal movement of the operating member to impart either a lateral or up and down swinging movement to the lamp on one or the other of said axes, said connecting means comprising a pair of links having pivotal and sliding connections with opposite sides of the first mentioned member.

5. A dirigible lamp comprising, in combination, a lamp having an axial stem, a member encircling said stem and rigid therewith, said member being mounted to turn on two approximately perpendicular intersecting axes, a second member rotatable on the stem rotatable relative to the first member but held against longitudinal movement relative thereto, an operating rod mounted for sliding and rotary movement and inclined to the axis of said stem, and means connecting said rod with opposite sides of the rotatable member whereby to impart swinging movements to the lamp on said intersecting axes in the longitudinal and rotary movements of the rod.

6. A dirigible light comprising, in combination, a lamp having an axial stem, a member encircling said stem and rigid therewith, said member mounted to turn on two approximately perpendicular intersecting axes, a second member rotatable on the stem rotatable relative to the first member but held against longitudinal movement relative thereto, an operating member mounted for sliding and rotary movement and inclined to the axis of said stem, and means connecting said operating member with the rotatable member whereby to impart swinging movements to the lamp on said intersecting axes in the longitudinal and rotary movements of the rod, the means for supporting the first mentioned member comprising a bracket and a ball mounted to turn in said bracket and having a shank rigid with the member.

7. The combination with a lamp having a stem, a member mounted to turn relative to and about the axis of said stem, but held against longitudinal movement thereon, means for supporting said member so that it may turn upon intersecting axes, an operating rod mounted for rotational and reciprocal movements, a member mounted on said rod and extending transversely thereof, and means operatively connecting said two members whereby a twisting motion imparted to the rod causes the lamp to swing on one axis, and a longitudinal movement imparted to the rod causes the lamp to swing an another axis.

8. The combination with a lamp having a stem, a member mounted to rotate on said stem, but held against longitudinal movement thereon, means for universally supporting said member, and an operating rod mounted for reciprocal and longitudinal movements and having a pair of spaced arms pivotally connected with diametrically opposite sides of said member.

9. The combination with a lamp having a stem, an annular member rigid with said stem, a second member mounted to rotate on said stem and having a pair of inwardly extending diametrically disposed studs, said stationary member being grooved to receive said studs, means for universally supporting the lamp, an operating rod mounted for reciprocal and longitudinal movements, and means including a pair of arms mounted to move with said rod and respectively connected to said studs.

10. A dirigible light comprising, in combination, a lamp, and means for supporting the lamp to turn on two substantially perpendicular intersecting axes comprising a bracket having a pair of members spaced apart with opposed apertures therein, a ball rigid with the lamp, and a pair of plates having depressed portions mounted in the respective apertures and providing bearing sockets for said ball, a lubricating ring interposed between said members and encircling the ball, and an annular member for confining said ring.

11. The combination with a lamp having a stem, an annular member rigid with said stem, a second member rotatable relative to and about the axis of said stem, means operatively connecting said members so as to permit rotation of the second member but hold it against longitudinal movement on the stem, means for universally supporting the lamp, an operating rod mounted for reciprocal and longitudinal movements, and means operatively connecting said rod with said second member, whereby rotational movements imparted to the rod will swing the lamp on one axis and reciprocal movements imparted to the rod will swing the rod on another axis.

12. The combination with a lamp having a stem, a member mounted to rotate on said stem but held against longitudinal movements thereon, means for universally supporting the lamp, an operating rod mounted for rotational and reciprocal movements, a member mounted on said rod transversely thereof, a plate pivoted on said member substantially perpendicular to the pivotal axis of said member, and a pair of arms pivotally connecting the opposite ends of said plate with diametrically opposite sides of the rotary member on the stem.

13. The combination with a lamp having a stem, a member mounted to turn relative to and about the axis of said stem but held against longitudinal movement thereon, means for universally supporting the lamp, and means for causing the lamp to swing on either of two intersecting axes including an operating rod mounted for reciprocal and rotational movements and operatively connected with said member.

14. The combination with a lamp, of means for swingably supporting the lamp comprising a stem rigid with the lamp, a member mounted on said stem so as to rotate thereon about the axis of the stem, said member being held against longitudinal movement relative to the stem, an operating rod mounted for rotational movements on an inclined axis relative to the axis of the stem, and means operable in the rotation of said rod to impart a combined rotational and swinging movement to said member whereby to impart a swinging movement to the lamp.

In testimony whereof, I have hereunto affixed my signature.

LESTER M. WALDEN.